US012749778B2

(12) United States Patent
Nishijima et al.

(10) Patent No.: US 12,749,778 B2
(45) Date of Patent: Sep. 29, 2026

(54) BATTERY CELL AND METHOD OF MANUFACTURING SAME

(71) Applicant: Prime Planet Energy & Solutions, Inc., Tokyo (JP)

(72) Inventors: Hiromasa Nishijima, Hirakata (JP); Tomokazu Yamanaka, Kakogawa (JP); Yoshitaka Matsumasa, Takatsuki (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 749 days.

(21) Appl. No.: 18/173,034

(22) Filed: Feb. 22, 2023

(65) Prior Publication Data

US 2023/0275328 A1 Aug. 31, 2023

(30) Foreign Application Priority Data

Feb. 25, 2022 (JP) ................................ 2022-028277

(51) Int. Cl.

| | |
|---|---|
| ***H01M 50/00*** | (2021.01) |
| ***B23K 26/24*** | (2014.01) |
| ***H01M 50/533*** | (2021.01) |
| ***H01M 50/534*** | (2021.01) |
| ***H01M 50/536*** | (2021.01) |

(52) U.S. Cl.

CPC ........... *H01M 50/536* (2021.01); *B23K 26/24* (2013.01); *H01M 50/533* (2021.01); *H01M 50/534* (2021.01)

(58) Field of Classification Search

CPC . H01M 50/533; H01M 50/536; H01M 50/534
See application file for complete search history.

(56) References Cited

U.S. PATENT DOCUMENTS

2015/0318535 A1 11/2015 Nagamine et al.
2016/0260952 A1* 9/2016 Park .................... H01M 50/536

(Continued)

FOREIGN PATENT DOCUMENTS

CN 104981316 A 10/2015
CN 215732092 U * 2/2022

(Continued)

OTHER PUBLICATIONS

Zhou et al, Electric Core Assembly, Battery And Electric Device, Feb. 2022, See the Abstract. (Year: 2022).*

(Continued)

*Primary Examiner* — Tiffany Legette
*Assistant Examiner* — Monique M Wills
(74) *Attorney, Agent, or Firm* — HAUPTMAN HAM, LLP

(57) ABSTRACT

A battery cell includes: a case including a main body provided with an opening, and a sealing plate that seals the main body; an electrode assembly accommodated in the case and having an electrode tab; and a current collector joined to the electrode tabs. The electrode tab has a stacking structure of metal foils, and a plurality of burring-processed portions along a stacking direction of the metal foils are formed in the electrode tab. A laser-welded portion that joins the electrode tab and the current collector is formed at least in a region located between the plurality of burring-processed portions or at least in a region adjacent to the plurality of burring-processed portions.

17 Claims, 9 Drawing Sheets

(56) References Cited

U.S. PATENT DOCUMENTS

| | | | |
|---|---|---|---|
| 2018/0287124 | A1 | 10/2018 | Kambayashi et al. |
| 2018/0361516 | A1 | 12/2018 | Kobayashi et al. |

FOREIGN PATENT DOCUMENTS

| | | | | |
|---|---|---|---|---|
| CN | 215732094 | U | * | 2/2022 |
| EP | 2946868 | A1 | | 11/2015 |
| JP | 2006-202539 | A | | 8/2006 |
| JP | 2011-049065 | A | | 3/2011 |
| JP | 2011-159518 | A | | 8/2011 |
| JP | 2011-233462 | A | | 11/2011 |
| JP | 2012-129114 | A | | 7/2012 |
| JP | 2013-084448 | A | | 5/2013 |
| JP | 2013166182 | A | | 8/2013 |
| JP | 2019-005768 | A | | 1/2019 |
| JP | 2019207767 | A | | 12/2019 |
| JP | 6784232 | B2 | | 11/2020 |
| WO | 2017/057323 | A1 | | 4/2017 |

OTHER PUBLICATIONS

Hong et al, A Battery Tab And Lithium Ion Battery, Feb. 2022, See the Abstract. (Year: 2022).*

* cited by examiner

BATTERY CELL AND METHOD OF MANUFACTURING SAME

This nonprovisional application is based on Japanese Patent Application No. 2022-028277 filed on Feb. 25, 2022 with the Japan Patent Office, the entire contents of which are hereby incorporated by reference.

BACKGROUND OF THE INVENTION

Field of the Invention

The present technology relates to a battery cell and a method of manufacturing the battery cell.

Description of the Background Art

Japanese Patent Laying-Open No. 2019-207767 discloses that a protective member provided with a plurality of through holes in a stacking direction of tabs is used at a welded portion between a tab group of an electrode assembly and a conductive member, and a laser emitting device is moved across the plurality of holes.

Japanese Patent No. 6784232 discloses that in a structure in which stacked metal foils of an electrode tab of a secondary battery are welded to a pair of metal plates, the stacked metal foils sandwiched between the pair of metal plates is locally pressed and swaged in a stacking direction at a portion to be welded.

Japanese Patent Laying-Open No. 2013-166182 discloses that a welded portion between stacked metal foils is provided with a cut extending therethrough along a stacking direction by using a cutter having a substantially V-shaped longitudinal cross sectional shape, and the metal foils are brought into close contact with each other at end portions of the cut in the stacking direction.

SUMMARY OF THE INVENTION

From a viewpoint of forming an excellent laser-welded portion between an electrode tab and a current collector, there is still room for improvement in the conventional joining structures. From a viewpoint different from those of the conventional structures, the inventors of the present application have examined a structure to form an excellent laser-welded portion.

An object of the present technology is to provide: a battery cell in which an excellent laser-welded portion between an electrode tab and a current collector is formed; and a method of manufacturing such a battery cell.

A battery cell according to the present technology includes: a case including a main body provided with an opening, and a sealing plate that seals the main body; an electrode assembly accommodated in the case and having an electrode tab; and a current collector joined to the electrode tab. The electrode tab has a stacking structure of metal foils, and a plurality of burring-processed portions along a stacking direction of the metal foils are formed in the electrode tab. A laser-welded portion that joins the electrode tab and the current collector is formed at least in a region located between the plurality of burring-processed portions or at least in a region adjacent to the plurality of burring-processed portions.

A method of manufacturing a battery cell according to the present technology includes: producing an electrode assembly including an electrode tab having a stacking structure of metal foils; placing a current collector on the electrode tab; performing a burring process onto the electrode tab at a first position and a second position separated from each other, along a stacking direction of the metal foils; joining the electrode tab and the current collector by laser welding at least in a region located between the first position and the second position or at least in a region adjacent to the first position and the second position; accommodating the electrode assembly and the current collector in a case body after joining the electrode tab and the current collector; and sealing, with a sealing plate, the case body in which the electrode assembly and the current collector are accommodated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
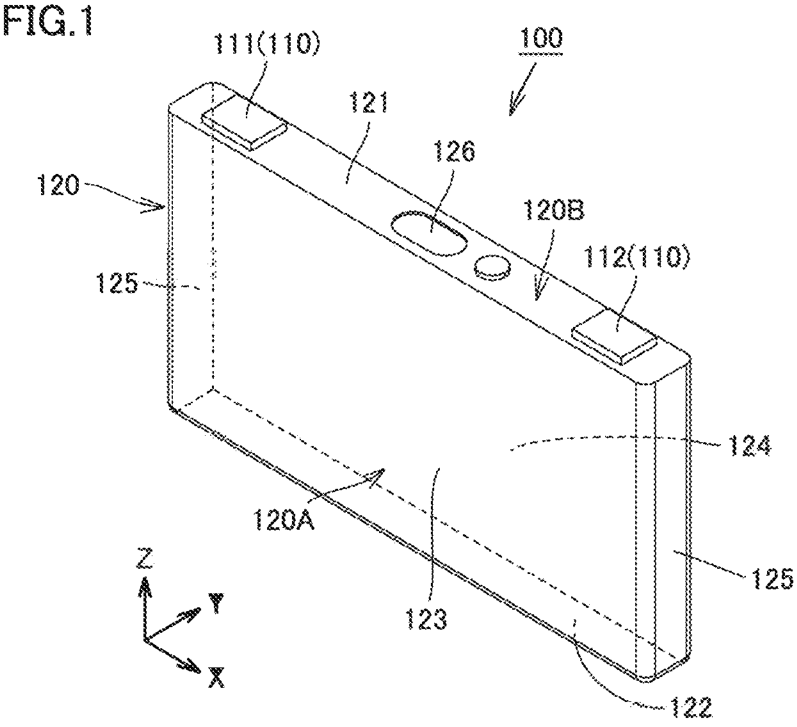
FIG. 1 is a perspective view showing a battery cell.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In the present specification, the term "battery" is not limited to a lithium ion battery, and may include other batteries such as a nickel-metal hydride battery and a sodium ion battery. In the present specification, the term "electrode" may collectively represent a positive electrode and a negative electrode.

In the present specification, the term "battery cell" is not necessarily limited to a prismatic battery cell and may include a cell having another shape such as a cylindrical battery cell.

Further, the "battery cell" can be mounted on vehicles such as a hybrid electric vehicle (HEV), a plug-in hybrid electric vehicle (PHEV), and a battery electric vehicle (BEV). It should be noted that the use of the "battery cell" is not limited to the use in a vehicle.

FIG. 1 is a perspective view showing a battery cell 100. As shown in FIG. 1, battery cell 100 has a prismatic shape. Battery cell 100 has electrode terminals 110 and a housing 120 (exterior container). That is, battery cell 100 is a prismatic secondary battery cell.

Electrode terminals 110 are formed on housing 120. Electrode terminals 110 have a positive electrode terminal 111 and a negative electrode terminal 112 arranged side by side along an X axis direction (second direction) orthogonal to a Y axis direction (first direction). Positive electrode terminal 111 and negative electrode terminal 112 are provided to be separated from each other in the X axis direction.

Housing 120 has a rectangular parallelepiped shape and forms an external appearance of battery cell 100. Housing 120 includes a case body 120A and a sealing plate 120B that seals an opening of case body 120A. Sealing plate 120B is joined to case body 120A by welding.

Housing 120 has an upper surface 121, a lower surface 122, a first side surface 123, a second side surface 124, and two third side surfaces 125. Housing 120 is provided with a gas-discharge valve 126.

Upper surface 121 is a flat surface orthogonal to a Z axis direction (third direction) orthogonal to the Y axis direction and the X axis direction. Electrode terminals 110 are disposed on upper surface 121. Lower surface 122 faces upper surface 121 along the Z axis direction.

Each of first side surface 123 and second side surface 124 is constituted of a flat surface orthogonal to the Y axis direction. Each of first side surface 123 and second side surface 124 has the largest area among the areas of the plurality of side surfaces of housing 120. Each of first side surface 123 and second side surface 124 has a rectangular shape when viewed in the Y axis direction. Each of first side surface 123 and second side surface 124 has a rectangular shape in which the X axis direction corresponds to the long-side direction and the Z axis direction corresponds to the short-side direction when viewed in the Y axis direction.

When the plurality of battery cells 100 are connected in series, a plurality of battery cells 100 are stacked such that first side surfaces 123 of battery cells 100, 100 adjacent to each other in the Y direction face each other and second side surfaces 124 of battery cells 100, 100 adjacent to each other in the Y axis direction face each other. Thus, positive electrode terminals 111 and negative electrode terminals 112 are alternately arranged in the Y axis direction in which the plurality of battery cells 100 are stacked.

Gas-discharge valve 126 is provided in upper surface 121. When the temperature of battery cell 100 is increased in an abnormal manner (thermal runaway) and internal pressure of housing 120 becomes more than or equal to a predetermined value due to gas generated inside housing 120, gas-discharge valve 126 discharges the gas to outside of housing 120.

Figure 2:
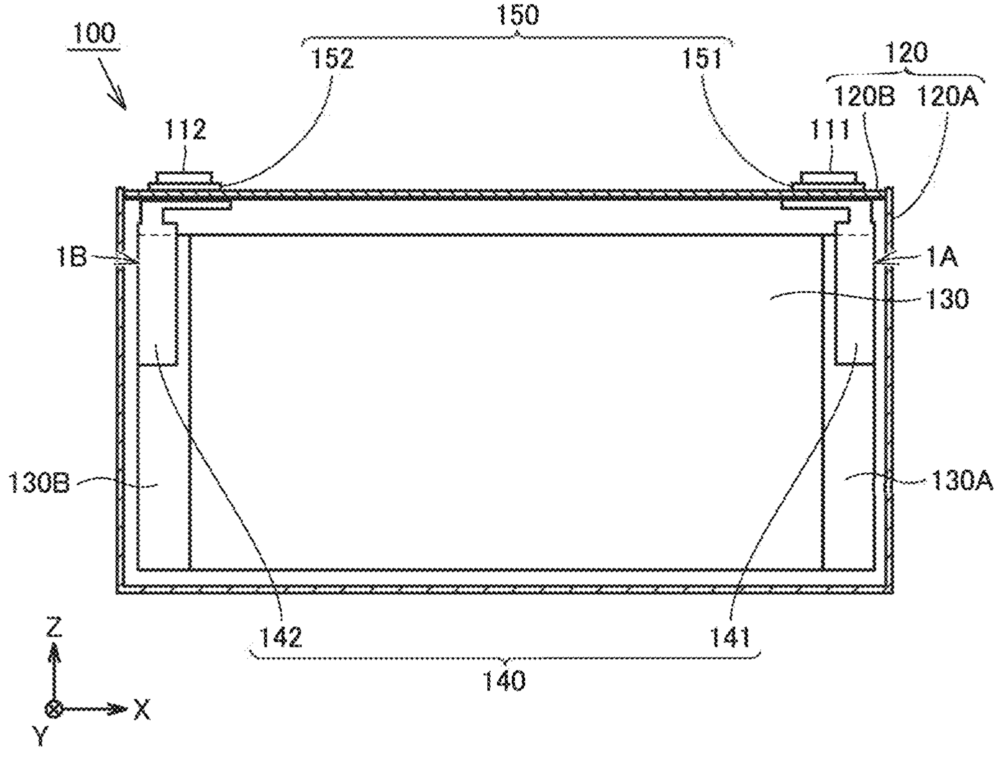
FIG. 2 is a cross sectional view of the battery cell when viewed in a Y axis direction.

FIG. 2 is a schematic view showing an exemplary configuration of an electrode assembly. As shown in FIG. 2, in battery cell 100, an electrode assembly 130, current collecting members 140, and an electrolyte solution (not shown) are accommodated inside housing 120. Current collecting members 140 include a positive electrode current collecting member 141 and a negative electrode current collecting member 142.

Electrode terminals 110 are fixed to sealing plate 120B with insulating members 150, each of which is composed of a resin, being interposed therebetween. Insulating members 150 include an insulating member 151 on the positive electrode side and an insulating member 152 on the negative electrode side.

Each electrode terminal 110 and electrode assembly 130 are electrically connected to each other through current collecting member 140. Specifically, electrode assembly 130 is connected to positive electrode terminal 111 by positive electrode current collecting member 141. Electrode assembly 130 is connected to negative electrode terminal 112 by negative electrode current collecting member 142.

A positive electrode tab 130A and a negative electrode tab 130B are formed at both ends with respect to electrode assembly 130 in the X axis direction. Positive electrode tab 130A is joined to positive electrode current collecting member 141 at a joined portion 1A. Negative electrode tab 130B is joined to negative electrode current collecting member 142 at a joined portion 1B.

In the example of FIG. 2, positive electrode tab 130A and negative electrode tab 130B are formed separately on both sides with respect to electrode assembly 130 in the X axis direction; however, the arrangement of positive electrode tab 130A and negative electrode tab 130B is not limited thereto. For example, positive electrode tab 130A and negative electrode tab 130B may be arranged on the sealing plate 120B side (upper side in FIG. 2) of electrode assembly 130 in the Z axis direction.

Figure 3:
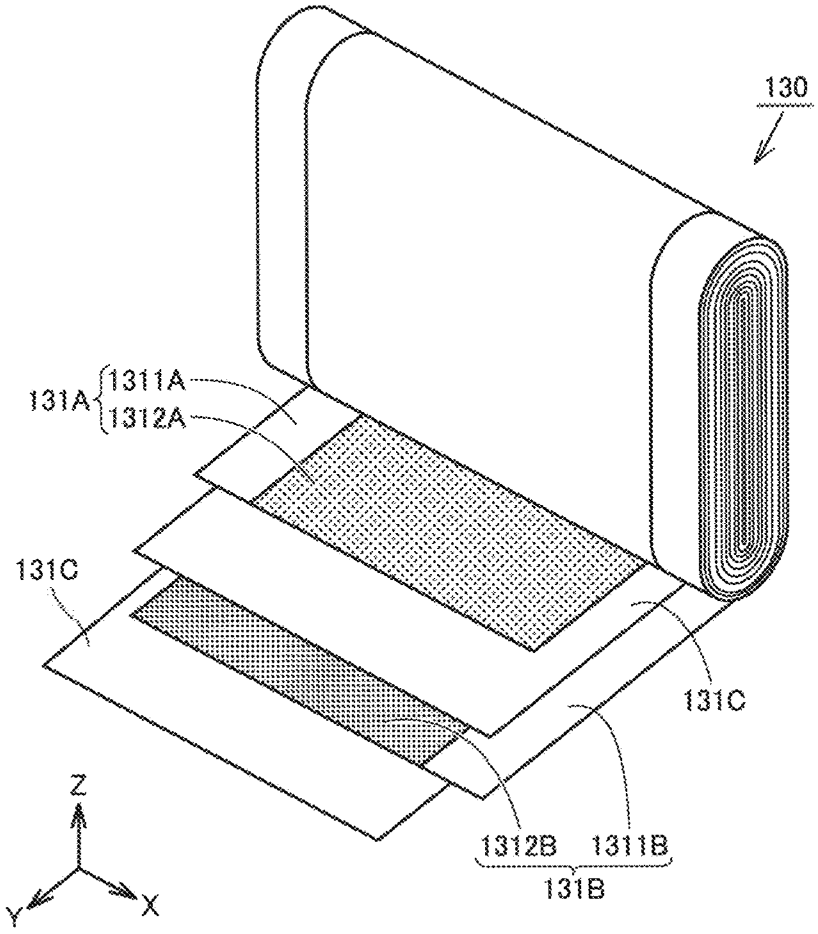
FIG. 3 is a schematic view showing an exemplary configuration of an electrode assembly.

FIG. 3 is a schematic view showing an exemplary configuration of electrode assembly 130. In the example shown in FIG. 3, electrode assembly 130 is of a wound type. Electrode assembly 130 is not limited to the wound type, and may be of a stack type.

In the example of FIG. 3, electrode assembly 130 includes a positive electrode 131A, a negative electrode 131B, and a separator 131C. Each of positive electrode 131A, negative electrode 131B, and separator 131C is a sheet in the form of a strip. Electrode assembly 130 may include a plurality of separators 131C. Separator 131C is sandwiched between positive electrode 131A and negative electrode 131B. Electrode assembly 130 is formed by spirally winding a stack of positive electrode 131A, negative electrode 131B, and separator 131C. Electrode assembly 130 may be shaped to be flat after the winding.

Positive electrode 131A includes a positive electrode substrate 1311A and a positive electrode active material layer 1312A. Positive electrode substrate 1311A is a conductive sheet. Positive electrode substrate 1311A may be, for example, an aluminum alloy foil or the like. Positive electrode substrate 1311A may have a thickness of, for example, about 10 μm to 30 μm. Positive electrode active material layer 1312A is disposed on a surface of positive electrode substrate 1311A. For example, positive electrode active material layer 1312A may be disposed only on one surface of positive electrode substrate 1311A. Positive electrode active material layer 1312A may be disposed, for example, on each of both front and rear surfaces of positive electrode substrate 1311A. Positive electrode substrate 1311A may be exposed at one end portion in the width direction (X axis direction) of positive electrode 131A. Positive electrode current collecting member 141 is joined to the portion at which positive electrode substrate 1311A is exposed.

For example, an intermediate layer (not shown) may be formed between positive electrode active material layer 1312A and positive electrode substrate 1311A. In the present specification, also when the intermediate layer is present, positive electrode active material layer 1312A is regarded as being disposed on the surface of positive electrode substrate 1311A. The intermediate layer may be thinner than positive electrode active material layer 1312A. The intermediate layer may have a thickness of about 0.1 μm to 10 μm, for example. The intermediate layer may include, for example, a conductive material, an insulating material, or the like.

Positive electrode active material layer 1312A may have a thickness of, for example, about 10 μm to 200 μm. Positive electrode active material layer 1312A may have a thickness of, for example, about 130 μm to 1130 μm. Positive electrode active material layer 1312A may have a thickness of, for example, about 130 μm to 100 μm.

Positive electrode active material layer 1312A includes a positive electrode active material. The positive electrode active material is a particle group. Positive electrode active material layer 1312A may further include an additional component as long as the positive electrode active material is included. Positive electrode active material layer 1312A may include, for example, a conductive material, a binder, or the like in addition to the positive electrode active material. The conductive material can include any component. For example, the conductive material may include at least one selected from a group consisting of carbon black, graphite, vapor-grown carbon fiber (VGCF), carbon nanotube (CNT), and graphene flake. A blending amount of the conductive material may be, for example, about 0.1 part by mass to 10 parts by mass with respect to 100 parts by mass of the positive electrode active material. The binder can include any component. For example, the binder may include at least one selected from a group consisting of polyvinylidene difluoride (PVdF), poly(vinylidene fluoride-co-hexafluoropropylene) (PVdF-HFP), polytetrafluoroethylene (PTFE), and polyacrylic acid (PAA). A blending amount of the binder may be, for example, about 0.1 part by mass to 10 parts by mass with respect to 100 parts by mass of the positive electrode active material.

Positive electrode active material layer 1312A can have a high density. Positive electrode active material layer 1312A may have a density of, for example, about 3.6 $g/cm^3$ to 3.9 $g/cm^3$. Positive electrode active material layer 1312A may have a density of, for example, about 3.65 $g/cm^3$ to 3.81 $g/cm^3$. Positive electrode active material layer 1312A may have a density of, for example, about 3.70 $g/cm^3$ to 3.81 $g/cm^3$. In the present specification, the density of the active material layer represents an apparent density.

Negative electrode 131B may include a negative electrode substrate 1311B and a negative electrode active material layer 1312B, for example. Negative electrode substrate 1311B is a conductive sheet. Negative electrode substrate 1311B may be, for example, a copper alloy foil or the like. Negative electrode substrate 1311B may have a thickness of, for example, about 5 μm to 30 μm. Negative electrode active material layer 1312B may be disposed on a surface of negative electrode substrate 1311B. Negative electrode active material layer 1312B may be disposed only on one surface of negative electrode substrate 1311B, for example. Negative electrode active material layer 1312B may be disposed on each of the front and rear surfaces of negative electrode substrate 1311B, for example. Negative electrode substrate 1311B may be exposed at one end portion in the width direction (X axis direction in FIG. 2) of negative electrode 131B. Negative electrode current collecting member 142 can be joined to the portion at which negative electrode substrate 1311B is exposed.

Negative electrode active material layer 1312B may have a thickness of, for example, about 10 μm to 200 μm. Negative electrode active material layer 1312B includes a negative electrode active material. The negative electrode active material may include any component. The negative electrode active material may include, for example, at least one selected from a group consisting of graphite, soft carbon, hard carbon, silicon, silicon oxide, a silicon-based alloy, tin, tin oxide, a tin-based alloy, and a lithium-titanium composite oxide.

Negative electrode active material layer 1312B may further include, for example, a binder or the like in addition to the negative electrode active material. For example, negative electrode active material layer 1312B may include: about 95% to 99.5% of the negative electrode active material in mass fraction; and the remainder of the binder. The binder can include any component. The binder may include, for example, at least one selected from a group consisting of carboxymethyl cellulose (CMC) and styrene-butadiene rubber (SBR).

At least a portion of separator 131C is interposed between positive electrode 131A and negative electrode 131B. Separator 131C separates positive electrode 131A and negative electrode 131B from each other. Separator 131C may have a thickness of, for example, about 10 μm to 30 μm.

Separator 131C is a porous sheet. The electrolyte solution passes through separator 131C. Separator 131C may have an air permeability of, for example, about 200 s/100 mL to 400 s/100 mL. In the present specification, the "air permeability" represents "Air Resistance" defined in "JIS P 8117:2009". The air permeability is measured by the Gurley test method.

Separator 131C is electrically insulative. Separator 131C may include, for example, a polyolefin-based resin or the like. Separator 131C may consist essentially of a polyolefin-based resin, for example. The polyolefin-based resin may include at least one selected from a group consisting of polyethylene (PE) and polypropylene (PP), for example. Separator 131C may have a single-layer structure, for example. Separator 131C may consist essentially of a PE layer, for example. Separator 131C may have a multilayer structure, for example. Separator 131C may be formed by layering a PP layer, a PE layer, and a PP layer in this order, for example. A heat-resistant layer or the like may be formed on a surface of separator 131C, for example.

The electrolyte solution includes a solvent and a supporting electrolyte. The solvent is aprotic. The solvent can include any component. The solvent may include, for example, at least one selected from a group consisting of ethylene carbonate (EC), propylene carbonate (PC), butylene carbonate (BC), dimethyl carbonate (DMC), ethyl methyl carbonate (EMC), diethyl carbonate (DEC), 1,2-dimethoxyethane (DME), methyl formate (MF), methyl acetate (MA), methyl propionate (MP), and γ-butyrolactone (GBL).

The supporting electrolyte is dissolved in the solvent. For example, the supporting electrolyte may include at least one selected from a group consisting of $LiPF_6$, $LiBF_4$, and $LiN(FSO_2)_2$. The supporting electrolyte may have a molar concentration of, for example, about 0.5 mol/L to 2.0 mol/L. The supporting electrolyte may have a molar concentration of, for example, about 0.8 mol/L to 1.2 mol/L.

The electrolyte solution may further include any additive in addition to the solvent and the supporting electrolyte. For example, the electrolyte solution may include the additive having a mass fraction of about 0.01% to 5%. The additive may include, for example, at least one selected from a group consisting of vinylene carbonate (VC), lithium difluorophosphate ($LiPO_2F_2$), lithium fluorosulfonate ($FSO_3Li$), and lithium bis [oxalatoborate] (LiBOB).

In the example of FIG. 3, positive electrode substrate 1311A and negative electrode substrate 1311B located at both ends of electrode assembly 130 in the X axis direction are gathered to form positive electrode tab 130A and negative electrode tab 130B, respectively. Each of positive electrode tab 130A and negative electrode tab 130B has a stacking structure of metal foils.

Figure 4:
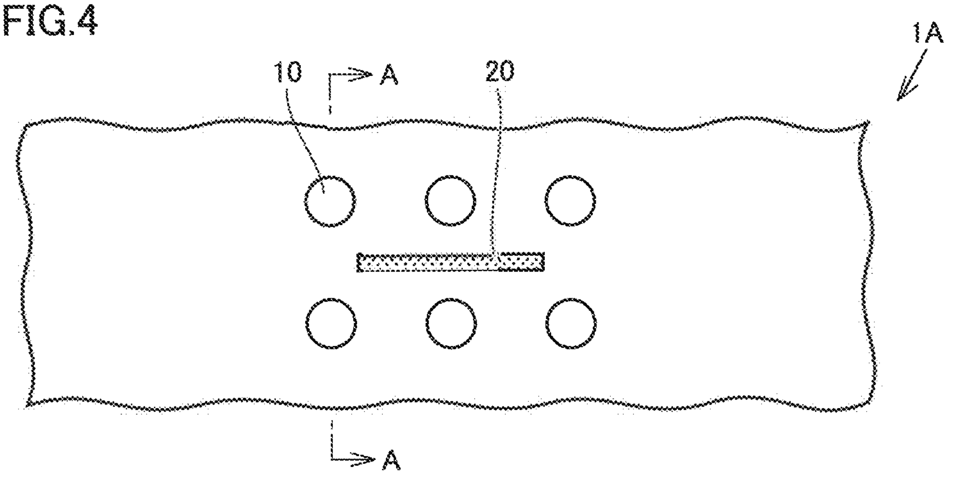
FIG. 4 is a first diagram showing a joined portion between an electrode tab and a current collector.

Next, the following describes a structure of joined portion 1A between positive electrode tab 130A (electrode tab) and positive electrode current collecting member 141 (current collector) with reference to FIG. 4. It should be noted that joined portion 1A on the positive electrode side will be illustrated in FIGS. 4 and 5 to 11; however, the same structure can be also applied to joined portion 1B on the negative electrode side.

FIG. 4 is a diagram showing joined portion 1A between positive electrode tab 130A (electrode tab) and positive electrode current collecting member 141 (current collector). It should be noted that joined portion 1A between positive electrode tab 130A and positive electrode current collecting member 141 will be described in FIGS. 4 and 5 to 18; however, the same structure as that of joined portion 1A may be applied to joined portion 1B between negative electrode tab 130B and negative electrode current collecting member 142.

As shown in FIG. 4, joined portion 1A includes a plurality of burring-processed portions 10 and a laser-welded portion 20 formed in a region between the plurality of burring-processed portions 10.

Burring-processed portions 10 are formed in positive electrode tab 130A with positive electrode tab 130A and positive electrode current collecting member 141 overlapping with each other. Burring-processed portions 10 are formed along the stacking direction of the metal foils of positive electrode tab 130A. In the example of FIG. 4, each of burring-processed portions 10 is formed to have a substantially circular shape when viewed in the stacking direction of the metal foils.

Laser-welded portion 20 joins positive electrode tab 130A and positive electrode current collecting member 141. Laser-welded portion 20 is formed along a lateral direction in FIG. 4. The extending direction (lateral direction in the figure) of laser-welded portion 20 in FIG. 4 may be parallel to the X axis direction, may be parallel to the Z axis direction, or may be a direction obliquely intersecting the X axis and the Z axis.

FIGS. 5 to 11 are diagrams showing joined portions 1A according to modifications. Referring to FIGS. 5 to 11, the following describes modifications of burring-processed portion 10 and laser-welded portion 20.

Figure 5:
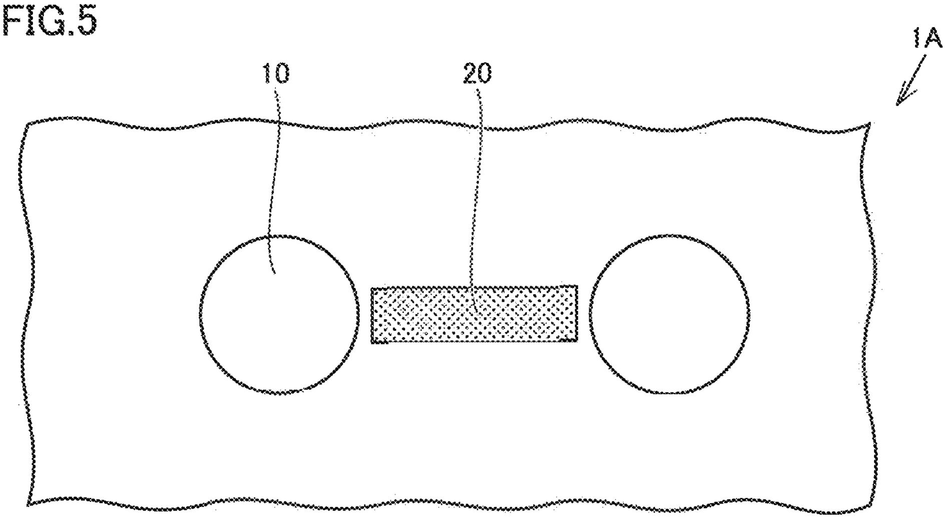
FIG. 5 is a second diagram showing the joined portion between the electrode tab and the current collector.
Figure 6:
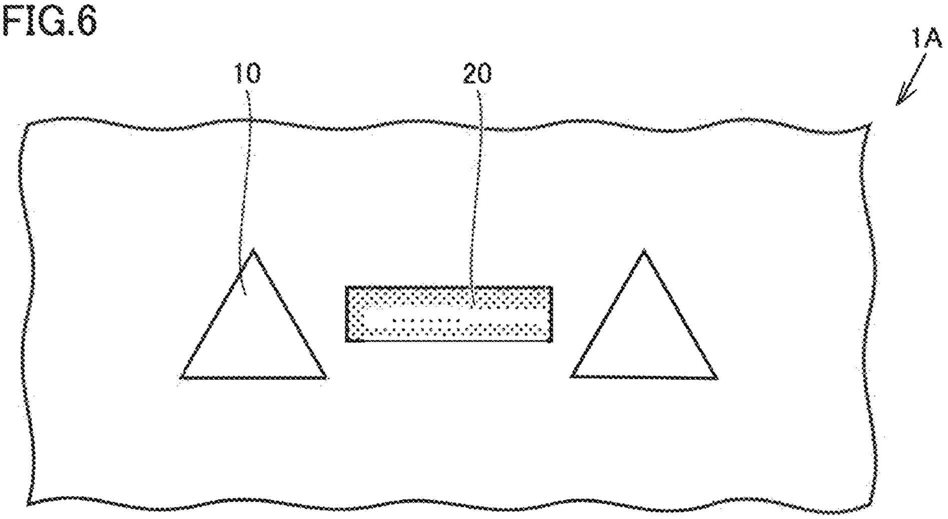
FIG. 6 is a third diagram showing the joined portion between the electrode tab and the current collector.
Figure 7:
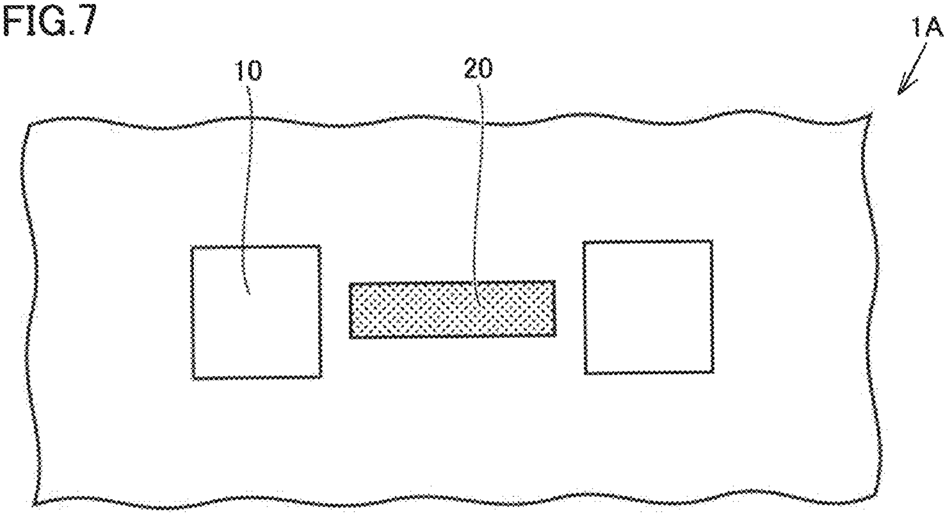
FIG. 7 is a fourth diagram showing the joined portion between the electrode tab and the current collector.
Figure 8:
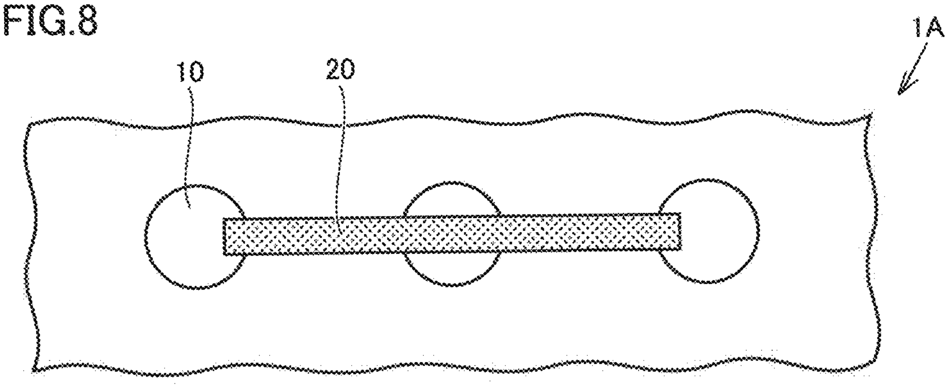
FIG. 8 is a fifth diagram showing the joined portion between the electrode tab and the current collector.

In each of the examples of FIGS. 5 to 7, two burring-processed portions 10 are formed side by side in the lateral direction in the figure. Laser-welded portion 20 is formed between two burring-processed portions 10 so as to extend in a direction in which two burring-processed portions 10 are disposed side by side. Thus, the number of the plurality of burring-processed portions 10 can be appropriately changed.

In the example of FIG. 5, as with the example of FIG. 4, each of burring-processed portions 10 is formed to have a substantially circular shape when viewed in the stacking direction of the metal foils. In the example of FIG. 6, each of burring-processed portions 10 is formed to have a substantially triangular shape when viewed in the stacking direction of the metal foils. In the example of FIG. 7, each of burring-processed portions 10 is formed to have a substantially quadrangular shape when viewed in the stacking direction of the metal foils. Burring-processed portion 10 may have another polygonal shape or an elliptical shape when viewed in the stacking direction of the metal foils, for example. Thus, the planar shape of burring-processed portion 10 can be appropriately changed.

In each of the examples of FIGS. 4 to 7, laser-welded portion 20 is formed to be separated from burring-processed portions 10 when viewed in the stacking direction of the metal foils. On the other hand, in the example of FIG. 8, parts of laser-welded portion 20 are formed to overlap with burring-processed portions 10 when viewed in the stacking direction of the metal foils.

Figure 9:
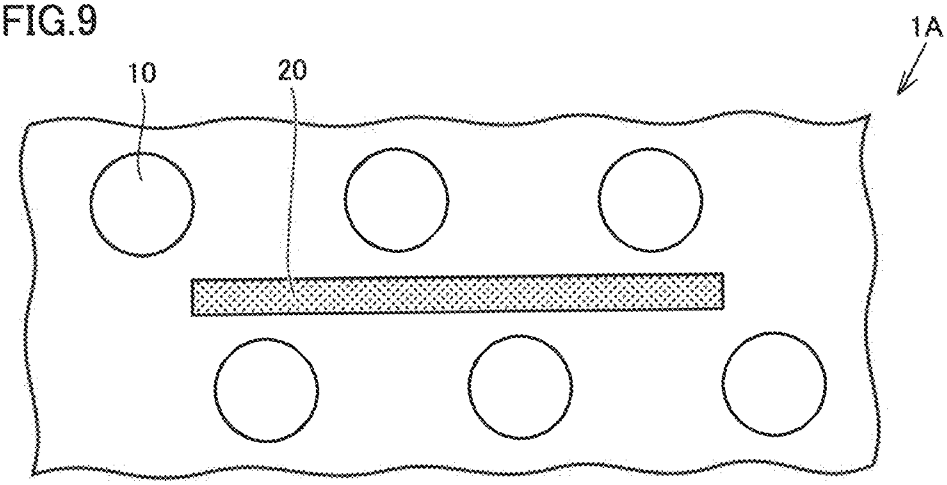
FIG. 9 is a sixth diagram showing the joined portion between the electrode tab and the current collector.
Figure 10:
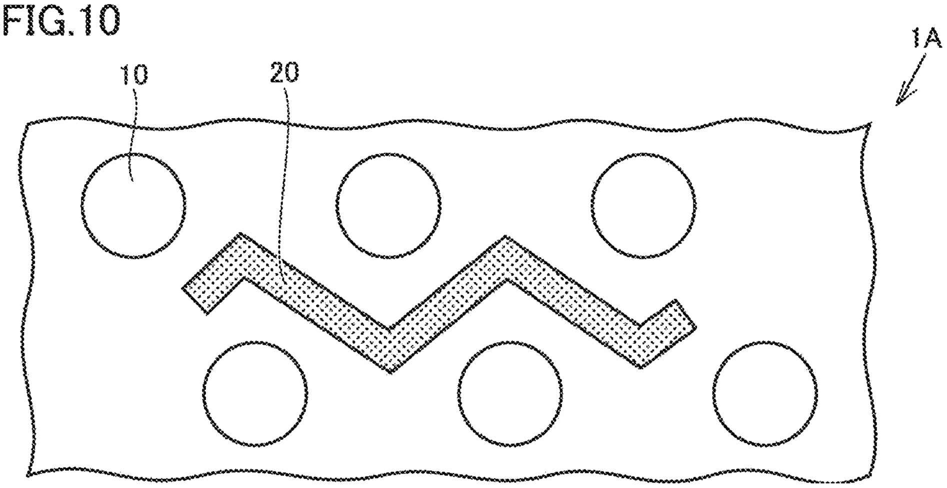
FIG. 10 is a seventh diagram showing the joined portion between the electrode tab and the current collector.

As shown in FIGS. 9 and 10, burring-processed portions 10 may be arranged in a staggered manner. Further, burring-processed portions 10 may not necessarily be arranged regularly. Thus, the arrangement of burring-processed portions 10 can be appropriately changed.

In the example of FIG. 9, laser-welded portion 20 is formed to extend in the lateral direction in the figure. In the example of FIG. 10, laser-welded portion 20 is formed to extend in a zigzag manner among burring-processed portions 10 arranged in the staggered manner. Thus, the extending direction and shape of laser-welded portion 20 can be also appropriately changed.

Figure 11:
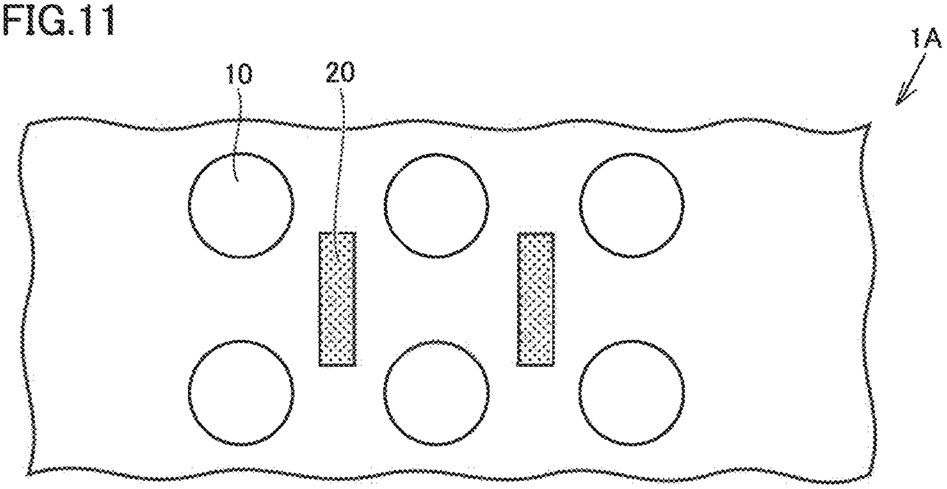
FIG. 11 is an eighth diagram showing the joined portion between the electrode tab and the current collector.

In the example shown in FIG. 11, two laser-welded portions 20 are formed separately among six burring-processed portions 10 arranged in two rows (longitudinal direction in the figure)×three columns (lateral direction in the figure). Thus, one laser-welded portion 20 is not necessarily provided in one joined portion 1A, and a plurality of laser-welded portions 20 may be formed separately.

Also in the modifications of FIGS. 5 to 11, as with the example of FIG. 4, the lateral direction or the longitudinal direction in the figure may be parallel to the X axis direction, may be parallel to the Z axis direction, or may be a direction obliquely intersecting the X axis and the Z axis.

Figure 12:
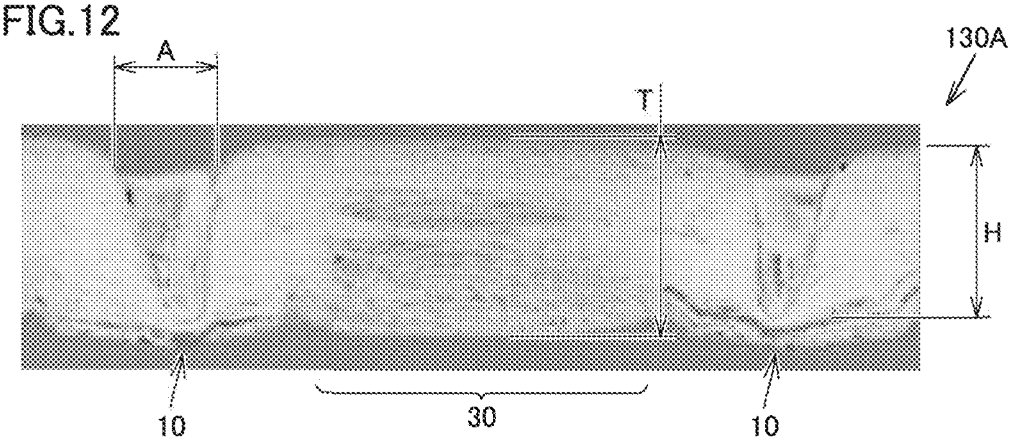
FIG. 12 is a cross sectional view showing a vicinity of a burring-processed portion of an electrode tab according to one example.

FIG. 12 is a cross sectional view showing a vicinity of burring-processed portion 10 of positive electrode tab 130A according to one example. FIG. 12 corresponds to a cross section taken along A-A in FIG. 4.

As shown in FIG. 12, burring-processed portion 10 has a tapered shape in which a processing width is narrower from the opening toward the tip. That is, the burring process is performed to attain a narrower processing width toward the tip. It should be noted that the shape of burring-processed portion 10 is not limited to the tapered shape.

In the example of FIG. 12, the burring process is performed to form a hole with a bottom in positive electrode tab 130A. Burring-processed portion 10 has a processing depth H of about 50% or more of total thickness T of positive electrode tab 130A. The burring process may be performed to extend through positive electrode tab 130A.

A close contact region 30 is formed between the plurality of burring-processed portions 10 with no or minimized clearance being formed between the stacked metal foils. By performing laser welding onto a region including close contact region 30, laser-welded portion 20 between positive electrode tab 130A and positive electrode current collecting member 141 is formed.

Figure 13:
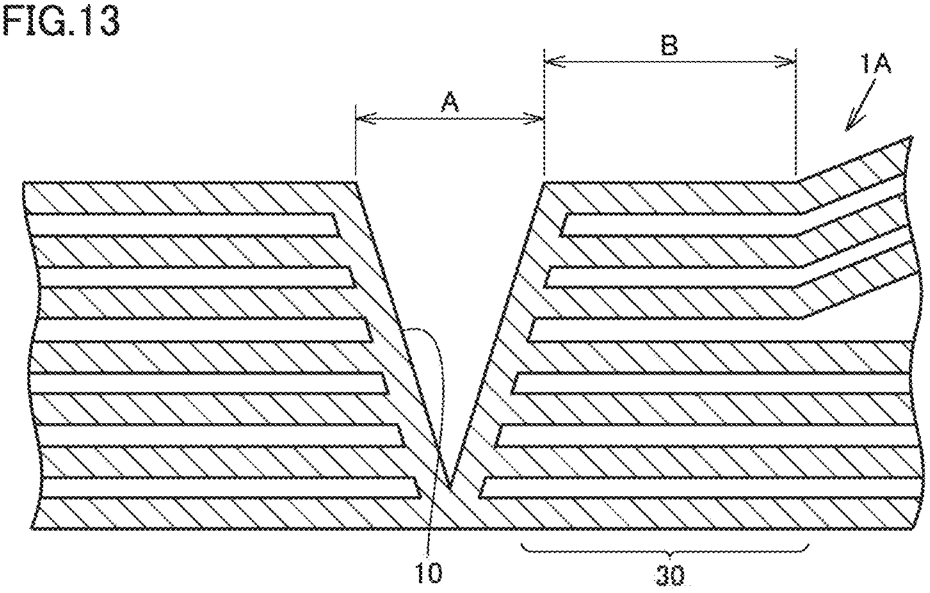
FIG. 13 is an enlarged cross sectional view schematically showing a structure in the vicinity of the burring-processed portion of the electrode tab.

FIG. 13 is an enlarged cross sectional view schematically showing a structure in the vicinity of burring-processed portion 10 of positive electrode tab 130A. As an example, a width A of the opening of burring-processed portion 10 is about 0.7 mm, for example. As an example, a width B of close contact region 30 located between the plurality of burring-processed portions 10 is about 1.5 mm, for example.

Figure 14:
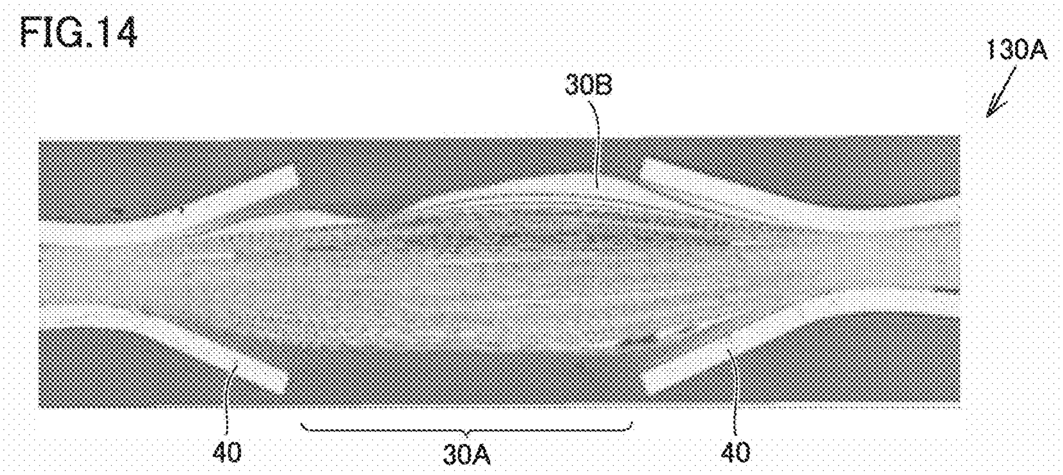
FIG. 14 is a cross sectional view showing a vicinity of a burring-processed portion of an electrode tab according to a comparative example.
Figure 15:
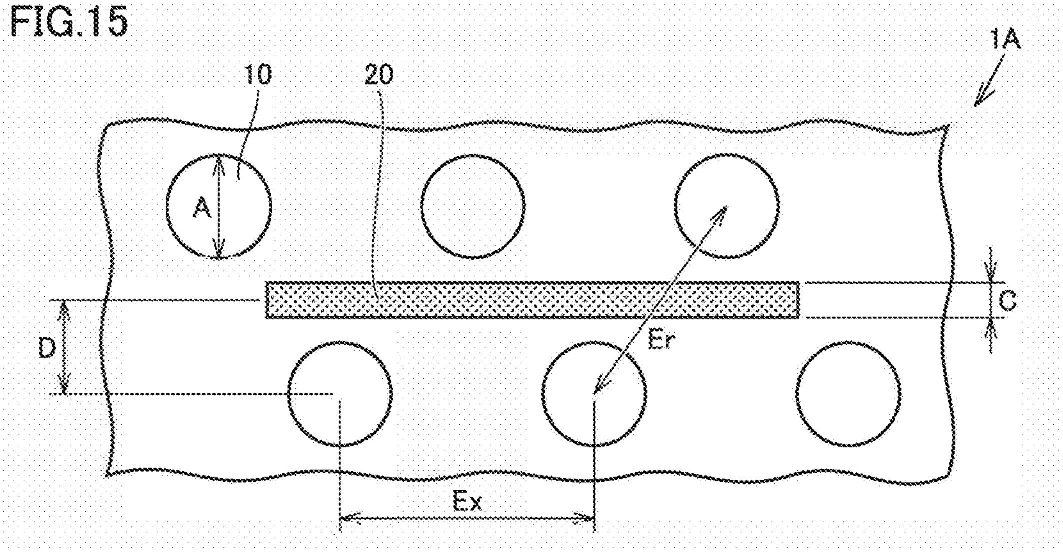
FIG. 15 is a first diagram for illustrating a dimensional relation in the vicinity of a laser-welded portion.

FIG. 14 is a cross sectional view showing a vicinity of a burring-processed portion 10 of a positive electrode tab 130A according to a comparative example. In FIG. 14, the metal foils of positive electrode tab 130A are sandwiched by a plurality of clips 40. A clearance 30B is formed between the metal foils located at an intermediate portion 30A between the plurality of clips 40. When laser welding is performed onto intermediate portion 30A at which clearance 30B is formed, insufficient welding is likely to be resulted at laser-welded portion 20.

On the other hand, in battery cell 100 according to the present embodiment, by performing the burring process onto positive electrode tab 130A located at joined portion 1A between positive electrode tab 130A and positive electrode current collecting member 141, laser welding can be performed with no or minimized clearance being formed in the stacking structure of the metal foils of positive electrode tab 130A. As a result, excellent laser-welded portion 20 can be formed between positive electrode tab 130A and positive electrode current collecting member 141. This also applies to joined portion 1B between negative electrode tab 130B and negative electrode current collecting member 142.

More specifically, the metal foils are likely to be in close contact with each other due to burrs generated during the burring process, thus resulting in one bundled stacking structure of the metal foils. Regarding this point, in a compression process of compressing the stacking structure of the metal foils to flatten the metal foils, it is difficult to bundle the metal foils close to positive electrode current collecting member 141 and negative electrode current collecting member 142 (current collector), with the result that a clearance may be formed between the metal foils. In order to securely avoid such a clearance between the metal foils, a significantly large compressive load is required. On the other hand, in battery cell 100 according to the present embodiment, since the burring process (hole forming process) is employed instead of the compression process, a close contact structure between the metal foils can be attained with a relatively smaller load than that in the compression process.

Further, with the burring process, an oxide film of a metal foil can be removed before being bundled into one. By bundling the metal foils into one, an influence of thermal strains (elongation and deflection of the metal foils) during laser welding can be suppressed. When the metal foils are bundled by temporary welding, thermal strains are generated in the metal foils, whereas no thermal strain is not generated in the burring process.

Next, a dimensional relation in the vicinity of laser-welded portion 20 will be described with reference to FIGS. 15 to 18. As shown in the schematic diagram of FIG. 15 and FIG. 13 described above, when the width (opening width) of the burring-processed portion is represented by A, the width of close contact region 30 is represented by B, a beam diameter during the laser welding is represented by C, a distance (longitudinal direction) between the center of burring-processed portion 10 and the center of the laser beam is represented by D, and pitches of burring-processed portion 10 are represented by Ex (lateral direction) and Er (oblique direction), the following relation is normally preferably satisfied (normal range):

$$A/2+C/2 \le D \le A/2+B-C/2$$

$$A+C \le Ex, Er < A+2\times B$$

Figure 16:
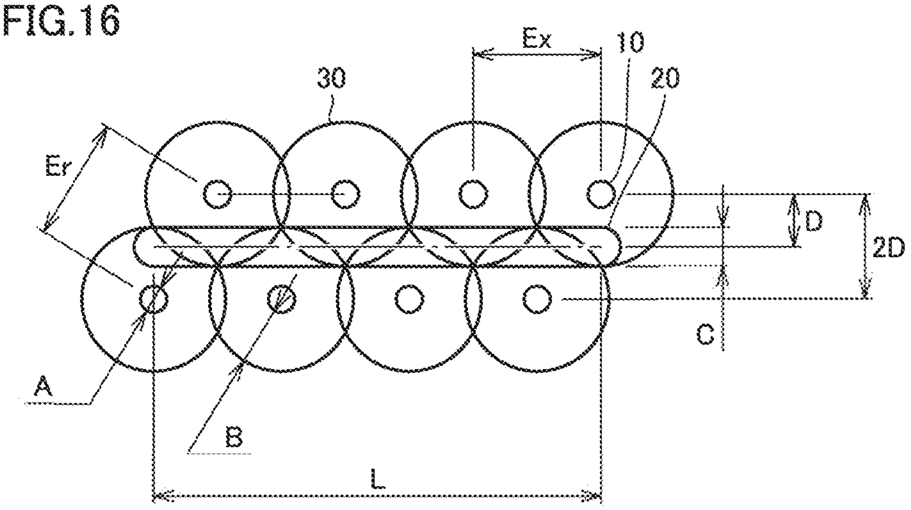
FIG. 16 is a second diagram for illustrating the dimensional relation in the vicinity of the laser-welded portion.

By satisfying the above relation, as shown in FIG. 16, regions located between the plurality of burring-processed portions 10 can be close contact regions 30 without clearance, and burring-processed portions 10 and laser-welded portion 20 can be avoided from overlapping with each other.

As an example, in the example shown in FIG. 16, width A of the burring-processed portion is 0.7 mm, width B of close contact region 30 (range with no clearance between the metal foils) is 1.55 mm, laser beam diameter C is 1.0 mm, distance (longitudinal direction) D between the center of burring-processed portion 10 and the center of the laser beam is 1.4 mm, pitch Ex of burring-processed portion 10 is 3.35 mm, pitch Er of burring-processed portion 10 is 3.26 mm, and applied length L of the laser beam is 11.74 mm. However, the values of A, B, C, D, Ex, Er and L are not limited thereto.

Laser beam diameter C can be appropriately changed. For example, laser beam diameter C can be appropriately changed within a range of about 0.1 mm or more and 1.0 mm or less, but the range of laser beam diameter C is not limited thereto. Laser beam diameter C may be made small and scanning may be performed a plurality of times. For example, the laser beam may be applied three times with laser beam diameter C=0.2 mm. When the laser beam is applied a plurality of times, the laser beam is applied with its center being deviated from a portion having been already welded. On this occasion, the laser beam may be applied so as to completely avoid the portion having been already welded or so as to partially overlap with the portion having been already welded.

Width (opening width) A of the burring-processed portion, width B of close contact region 30, beam diameter C during the laser welding, distance (longitudinal direction) D between the center of burring-processed portion 10 and the center of the laser beam, and pitches Ex (lateral direction) and Er (oblique direction) of burring-processed portion 10 may have the following relation (limited range):

$$C/2 \leq D \leq A/2 + B$$

$$Ex, Er = A + 2 \times B$$

Figure 17:
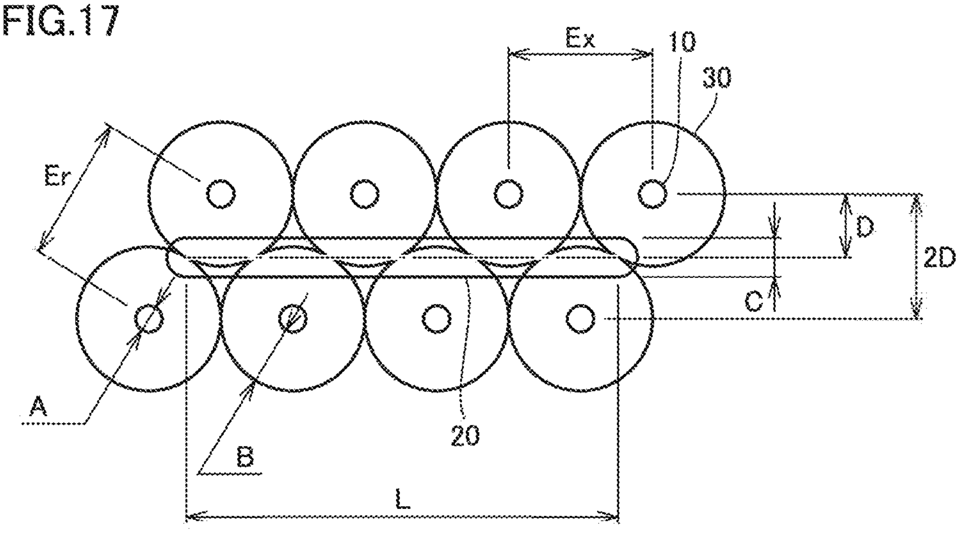
FIG. 17 is a third diagram for illustrating the dimensional relation in the vicinity of the laser-welded portion.

By satisfying the above relation, as shown in FIG. 17, most of the regions located between the plurality of burring-processed portions 10 can be close contact regions 30, and burring-processed portions 10 and laser-welded portion 20 can be avoided from overlapping with each other.

As an example, in the example shown in FIG. 17, width A of the burring-processed portion is 0.7 mm, width B of close contact region 30 (range with no clearance between the metal foils) is 1.55 mm, laser beam diameter C is 1.0 mm, distance (longitudinal direction) D between the center of burring-processed portion 10 and the center of the laser beam is 1.65 mm, pitch Ex of burring-processed portion 10 is 3.8 mm, pitch Er of burring-processed portion 10 is 3.8 mm, and applied length L of the laser beam is 11.4 mm. However, the values of A, B, C, D, Ex, Er and L are not limited thereto.

Laser beam diameter C is preferably less than or equal to width B of close contact region 30 (range with no clearance between the metal foils). However, also when $C \times 0.5 \leq B$, laser-welded portion 20 can be formed.

Preferably, laser-welded portion 20 does not overlap with burring-processed portion 10. In other words, it is preferable not to apply the laser beam to burring-processed portion 10. However, by adjusting the output of the laser (to be relatively small), laser-welded portion 20 can be formed even when laser-welded portion 20 partially overlaps with burring-processed portion 10.

Figure 18:
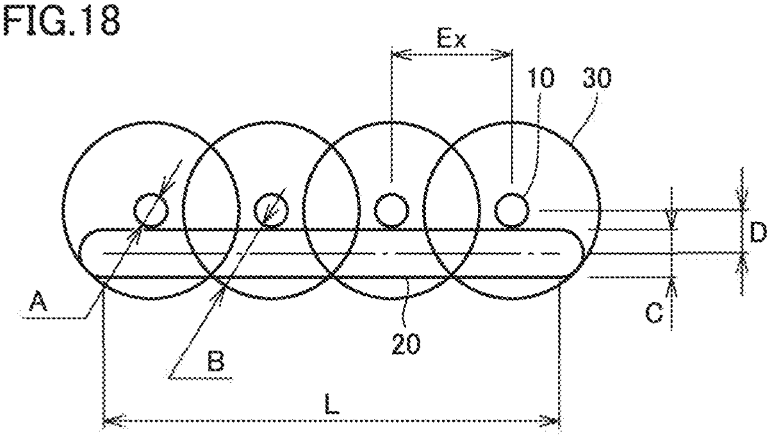
FIG. 18 is a fourth diagram for illustrating the dimensional relation in the vicinity of the laser-welded portion.

As shown in FIG. 18, laser-welded portion 20 can be also provided at a position adjacent to the plurality of burring-processed portions 10 formed in a line. Also in this case, laser-welded portion 20 can be formed in close contact regions 30 adjacent to the plurality of burring-processed portions 10, and burring-processed portions 10 and laser-welded portion 20 can be avoided from overlapping with each other.

In the example shown in FIG. 18, laser-welded portion 20 is formed to extend substantially in parallel with the direction (lateral direction in the figure) in which the plurality of burring-processed portions 10 are arranged side by side.

As an example, in the example shown in FIG. 18, width A of the burring-processed portion is 0.7 mm, width B of close contact region 30 (range with no clearance between the metal foils) is 1.55 mm, laser beam diameter C is 1.0 mm, distance (longitudinal direction) D between the center of burring-processed portion 10 and the center of the laser beam is 0.9 mm, pitch Ex of burring-processed portion 10 is 2.57 mm, and applied length L of the laser beam is 9.85 mm. However, the values of A, B, C, D, Ex and L are not limited thereto.

Also in each of the structures shown in FIGS. 17 and 18, laser beam diameter C and the number of times of applying the laser beam can be appropriately changed as with the case of FIG. 16. Further, as described above, a portion of laser-welded portion 20 may be formed outside close contact region 30 (portion with no or minimized clearance between the metal foils).

Figure 19:
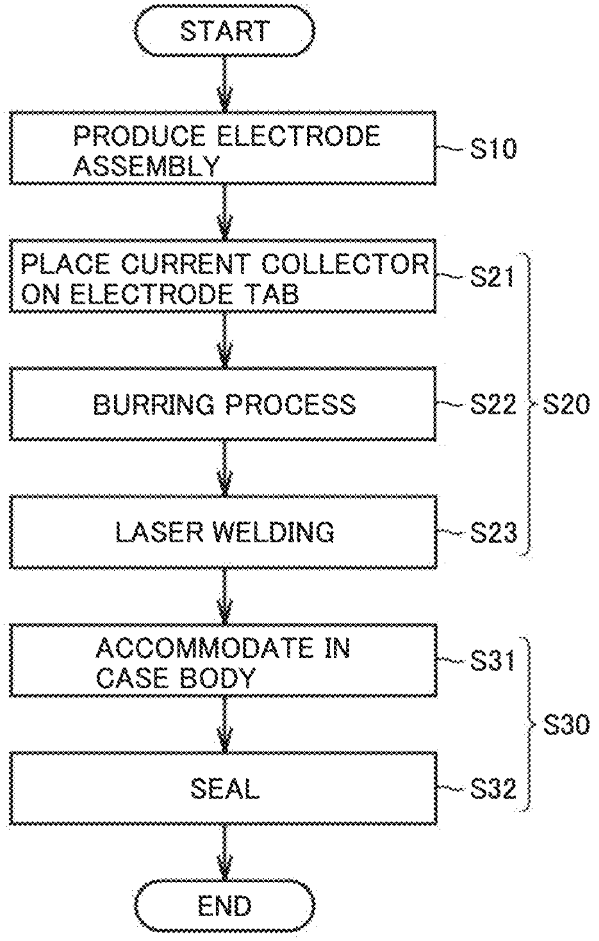
FIG. 19 is a flowchart showing steps of a method of manufacturing the battery cell.

FIG. 19 is a flowchart showing steps of a method of manufacturing battery cell 100. As shown in FIG. 19, the method of manufacturing the battery cell includes: a step (S10) of producing electrode assembly 130 including positive electrode tab 130A and negative electrode tab 130B each having the stacking structure of the metal foils; a step (S20) of joining positive electrode tab 130A and negative electrode tab 130B of electrode assembly 130 to positive electrode current collecting member 141 and negative electrode current collecting member 142, respectively; and a step (S30) of sealing electrode assembly 130, positive electrode current collecting member 141, and negative electrode current collecting member 142 in housing 120.

The step (S20) of joining electrode assembly 130 to positive electrode current collecting member 141 and negative electrode current collecting member 142 includes: a step (S21) of placing positive electrode current collecting member 141 and negative electrode current collecting member 142 on positive electrode tab 130A and negative electrode tab 130B; a step (S22) of performing the burring process onto each of positive electrode tab 130A and negative electrode tab 130B at a plurality of positions (first position and second position) separated from each other, along the stacking direction of the metal foils so as to form the plurality of burring-processed portions 10; and a step (S23) of joining positive electrode tab 130A and negative electrode tab 130B (electrode tab) to positive electrode current collecting member 141 and negative electrode current collecting member 142 (current collector) by laser welding in close contact region 30 located between the plurality of burring-processed portions 10 or adjacent to the plurality of burring-processed portions 10.

The step (S30) of sealing electrode assembly 130, positive electrode current collecting member 141, and negative electrode current collecting member 142 in housing 120 includes: a step (S31) of accommodating, in case body 120A, electrode assembly 130, positive electrode current collecting member 141, and negative electrode current collecting member 142, which are joined together; and a step (S32) of sealing, with sealing plate 120B, case body 120A in which electrode assembly 130, positive electrode current collecting member 141, and negative electrode current collecting member 142 are accommodated.

Although embodiments of the present invention have been described, it should be understood that the embodiments disclosed herein are illustrative and not restrictive in all respects. The scope of the present invention is defined by the claims, and is intended to include all changes within the scope and meaning equivalent to the claims.

What is claimed is:

1. A battery cell comprising:

a case including a main body provided with an opening, and a sealing plate that seals the main body;

an electrode terminal on an outer surface of the sealing plate;

an electrode assembly accommodated in the case and having an electrode tab; and a current collector joined to the electrode tab, wherein the electrode tab has a stacking structure of metal foils, and the electrode tab and the electrode terminal are electrically connected through the current collector;

a plurality of burring-processed portions along a stacking direction of the metal foils are formed in the electrode tab, wherein each of the plurality of burring-processed portions comprises a recess with a bottom in the electrode tab; and a laser-welded portion that joins the electrode tab and the current collector is formed at least in a region located between the plurality of burring-processed portions or at least in a region adjacent to the plurality of burring-processed portions.

2. The battery cell according to claim 1, wherein the laser-welded portion is separated from the burring-processed portions when viewed in the stacking direction of the metal foils.

3. The battery cell according to claim 1, wherein each of the burring-processed portions has a processing depth of 50% or more of a total thickness of the electrode tab.

4. The battery cell according to claim 1, wherein the laser-welded portion is separated from the burring-processed portions when viewed in the stacking direction of the metal foils, and each of the burring-processed portions has a processing depth of 50% or more of a total thickness of the electrode tab.

5. The battery cell according to claim 1, wherein each of the burring-processed portions has a tapered shape in which a processing width is narrower toward a tip.

6. The battery cell according to claim 1, wherein the laser-welded portion is separated from the burring-processed portions when viewed in the stacking direction of the metal foils, and each of the burring-processed portions has a tapered shape in which a processing width is narrower toward a tip.

7. The battery cell according to claim 1, wherein each of the burring-processed portions has a processing depth of 50% or more of a total thickness of the electrode tab, and each of the burring-processed portions has a tapered shape in which a processing width is narrower toward a tip.

8. The battery cell according to claim 1, wherein the laser-welded portion is separated from the burring-processed portions when viewed in the stacking direction of the metal foils, each of the burring-processed portions has a processing depth of 50% or more of a total thickness of the electrode tab, and each of the burring-processed portions has a tapered shape in which a processing width is narrower toward a tip.

9. A method of manufacturing a battery cell, the method comprising:

producing an electrode assembly including an electrode tab having a stacking structure of metal foils;

placing a current collector on the electrode tab;

performing a burring process onto the electrode tab at a first position and a second position separated from each other, along a stacking direction of the metal foils, wherein the burring process defines a plurality of recesses, and each of the plurality of recesses comprises a bottom in the electrode tab;

joining the electrode tab and the current collector by laser welding at least in a region located between the first position and the second position or at least in a region adjacent to the first position and the second position;

accommodating the electrode assembly and the current collector in a case body after joining the electrode tab and the current collector; and sealing, with a sealing plate, the case body in which the electrode assembly and the current collector are accommodated, wherein an electrode terminal is on an outer surface of the sealing plate, and the electrode terminal is electrically connected to the electrode tab through the current collector.

10. The method of manufacturing the battery cell according to claim 9, wherein a region onto which the laser welding is performed is separated from a region onto which the burring process is performed in each of the electrode tab and the current collector when viewed in the stacking direction of the metal foils.

11. The method of manufacturing the battery cell according to claim 9, wherein the burring process is performed to a depth of 50% or more of a total thickness of the electrode tab.

12. The method of manufacturing the battery cell according to claim 9, wherein a region onto which the laser welding is performed is separated from a region onto which the burring process is performed in each of the electrode tab and the current collector when viewed in the stacking direction of the metal foils, and the burring process is performed to a depth of 50% or more of a total thickness of the electrode tab.

13. The method of manufacturing the battery cell according to claim 9, wherein the burring process is performed to attain a narrower processing width toward a tip.

14. The method of manufacturing the battery cell according to claim 9, wherein a region onto which the laser welding is performed is separated from a region onto which the burring process is performed in each of the electrode tab and the current collector when viewed in the stacking direction of the metal foils, and the burring process is performed to attain a narrower processing width toward a tip.

15. The method of manufacturing the battery cell according to claim 9, wherein the burring process is performed to a depth of 50% or more of a total thickness of the electrode tab, and the burring process is performed to attain a narrower processing width toward a tip.

16. The method of manufacturing the battery cell according to claim 9, wherein a region onto which the laser welding is performed is separated from a region onto which the burring process is performed in each of the electrode tab and the current collector when viewed in the stacking direction of the metal foils, the burring process is performed to a depth of 50% or more of a total thickness of the electrode tab, and the burring process is performed to attain a narrower processing width toward a tip.

17. The battery cell according to claim 1, wherein the laser-welded portion is formed in a state where the opening of the plurality of burring-processed portions is opened, the region between the plurality of burring-processed portions includes the metal foils in close contact with each other, and the region adjacent to the plurality of burring-processed portions includes the metal foils in close contact with each other.

* * * * *